(12) United States Patent
Petherick et al.

(10) Patent No.: US 9,473,203 B2
(45) Date of Patent: Oct. 18, 2016

(54) SIGNAL SELECT IN UNDERGROUND LINE LOCATION

(71) Applicant: Metrotech Corporation, Santa Clara, CA (US)

(72) Inventors: Stephen John Petherick, Exeter (GB); George Mainescu, Hillsdale, NJ (US); Ion Dracea, Campina (RO); Razvan Gabriel Stefanoiu, Campina (RO); John Mark Royle, Exeter (GB)

(73) Assignee: METROTECH CORPORATION, Santa Clara, CA (US)

( * ) Notice: Subject to any disclaimer, the term of this patent is extended or adjusted under 35 U.S.C. 154(b) by 0 days.

(21) Appl. No.: 13/874,312

(22) Filed: Apr. 30, 2013

(65) Prior Publication Data

US 2013/0287125 A1     Oct. 31, 2013

Related U.S. Application Data

(60) Provisional application No. 61/640,441, filed on Apr. 30, 2012.

(51) Int. Cl.
| | |
|---|---|
| *H03K 9/00* | (2006.01) |
| *H03F 3/45* | (2006.01) |
| *H04B 3/04* | (2006.01) |
| *G01S 17/10* | (2006.01) |
| *H04B 3/46* | (2015.01) |
| *G01V 3/08* | (2006.01) |
| *G01V 3/15* | (2006.01) |

(52) U.S. Cl.
CPC ............. *H04B 3/04* (2013.01); *G01S 17/10* (2013.01); *G01V 3/08* (2013.01); *H04B 3/46* (2013.01); *G01V 3/15* (2013.01)

(58) Field of Classification Search
CPC .... H04B 17/0042; H04B 3/468; H04B 3/56; H04B 3/48; H04B 17/0002
USPC .......................................... 375/316; 330/254
See application file for complete search history.

(56) References Cited

U.S. PATENT DOCUMENTS

| | | | |
|---|---|---|---|
| 4,285,044 A | | 8/1981 | Thomas et al. |
| 4,840,485 A | * | 6/1989 | Gratton ............. G01N 21/6408 250/458.1 |
| 5,040,240 A | * | 8/1991 | Keegan .................. G01S 19/24 342/356 |
| 5,541,516 A | * | 7/1996 | Rider et al. ................... 324/326 |

(Continued)

FOREIGN PATENT DOCUMENTS

| | | |
|---|---|---|
| CN | 1823281 A | 8/2006 |
| CN | 101023690 A | 8/2007 |
| EP | 1 505 738 A1 | 2/2005 |

OTHER PUBLICATIONS

International Search Report and Written Opinion mailed Jul. 12, 2013 in International Appl. No. PCT/US2013/038945.

(Continued)

*Primary Examiner* — Daniel Washburn
*Assistant Examiner* — Sarah Hassan
(74) *Attorney, Agent, or Firm* — Haynes & Boone, LLP

(57) ABSTRACT

A transmitter and receiver for performing a signal select algorithm are provided. A transmitter for providing a signal on a line to be located includes at least one direct digital synthesizer, the direct digital synthesizer producing two component frequencies in response to an input square wave signal; and a feedback loop providing the input square wave.

14 Claims, 5 Drawing Sheets

(56) References Cited

U.S. PATENT DOCUMENTS

| | | | |
|---|---|---|---|
| 5,721,514 A * | 2/1998 | Crockett | H03L 7/26 331/3 |
| 6,307,441 B1 * | 10/2001 | Sharpe | H04L 27/2017 327/106 |
| 6,411,073 B1 | 6/2002 | Fischer et al. | |
| 6,418,174 B1 * | 7/2002 | Benedict | H04L 27/12 375/303 |
| 6,664,827 B2 | 12/2003 | O'Leary et al. | |
| 7,057,383 B2 | 6/2006 | Schlapp et al. | |
| 7,624,296 B2 | 11/2009 | Peters | |
| 2001/0007151 A1 * | 7/2001 | Vorenkamp | H01F 17/0006 725/151 |
| 2002/0006171 A1 * | 1/2002 | Nielsen | H03D 7/163 375/316 |
| 2002/0180498 A1 * | 12/2002 | O'Leary | H03L 7/0994 327/156 |
| 2003/0020544 A1 * | 1/2003 | Behzad | H01F 17/0006 330/254 |
| 2004/0135992 A1 * | 7/2004 | Munro | G01S 17/10 356/4.01 |
| 2004/0179628 A1 | 9/2004 | Haskin | |
| 2005/0096879 A1 | 5/2005 | Waite et al. | |
| 2005/0258901 A1 * | 11/2005 | Khorramabadi | H01F 17/0006 330/254 |
| 2007/0084636 A1 | 4/2007 | Royle | |
| 2008/0101309 A1 * | 5/2008 | Taniguchi | H04W 84/08 370/340 |
| 2008/0150591 A1 * | 6/2008 | Peters | 327/107 |

OTHER PUBLICATIONS

International Preliminary Report on Patentability mailed Nov. 13, 2014 in International Appl. No. PCT/US2013/038945.
Chinese Office Action mailed Jun. 1, 2016; Chinese Patent Application No. 201380029578.3; 10 pages.

* cited by examiner

SIGNAL SELECT IN UNDERGROUND LINE LOCATION

RELATED APPLICATIONS

This application claims priority to U.S. Provisional Application No. 61/640,441, filed on Apr. 30, 2012, which is herein incorporated by reference in its entirety.

BACKGROUND

1. Technical Field

The present disclosure relates to detection of underground lines and, in particular, to a signal select in underground line location.

2. Description of Related Art

Underground pipe and cable locators (often termed line locators) have existed for many years and are described in many issued patents and other publications. Line locator systems typically include a mobile receiver and a transmitter. The transmitter is coupled to a target conductor, either by direct electrical connection or through induction, to provide a current signal on the target conductor. The receiver detects and processes signals resulting from the electromagnetic field generated at the target conductor as a result of the current signal, which can be a continuous wave sinusoidal signal provided to the target conductor by the transmitter.

The transmitter is often physically separate from the receiver, with a typical separation distance of several meters or in some cases up to many kilometers. The transmitter couples the current signal, whose frequency can be user chosen from a selectable set of frequencies, to the target conductor. The frequency of the current signal applied to the target conductor can be referred to as the active locate frequency. The target conductor then generates an electromagnetic field at the active locate frequency in response to the current signal.

Different location methodologies and underground environments can call for different active frequencies. The typical range of active locate frequencies can be from several Hertz (for location of the target conductor over separation distances between the transmitter and receiver of many kilometers) to 100 kHz or more. Significant radio frequency interference on the electromagnetic field detected by the receiver can be present in the environment over this range. Therefore, receivers of line location systems have often included highly tuned filters to preclude interference from outside sources from affecting the measurement of signals at the desired active locate frequency from the target conductor. These filters can be tuned to receive signals resulting from electromagnetic fields at each of the selectable active locate frequencies and reject signals resulting from electromagnetic fields at frequencies other than the active locate frequencies.

In line location systems, the signal strength parameter determined from detection of the electromagnetic field provides basis for derived quantities of the current signal (i.e., the line current in the targeted conductor), position of the line locator receiver relative to the center of the conductor, depth of the conductor from the line locator receiver, and can also be used as the input to a peak or null indicator (depending on the orientation of the magnetic field to which that the detector is sensitive). All line location systems measure signal strength on one or more measurement channels.

Often in a crowded underground utility environment of metallic pipes and cables, coupling of signals at the active locating frequency from the target conductor to other adjacent underground conductors can occur. These conductors (lines) are not intended to be tracked by the line location system, but coupling of currents from the target conductor to those neighboring conductors through various means (resistive, inductive, or capacitive), termed "bleedover," can lead a line locator astray such that the operator of the line location system ceases tracking the targeted conductor (e.g., pipe or cable of interest) and instead begins following an adjacent line.

In conventional receivers, it is nearly impossible to determine whether the receiver is tracking the targeted conductor or whether the receiver is erroneously tracking a neighboring conductor. In complicated underground conductor topologies, the effect of interference from electromagnetic fields resulting from bleedover currents in neighboring conductors can result in significant asymmetrical electromagnetic fields, which is termed field distortion. Further, conventional systems that attempt to distinguish between the targeted conductor and neighboring conductors typically rely on transmission of phase information from the transmitter, which may be located at such a distance from the receiver of the line locator that receiving such information is impractical.

Therefore, there is a need for line location systems capable of accurately determining the signal strength parameter from the targeted conductor exclusive of neighboring conductors that may provide signals that are a result of inductive or capacitive coupling, using a signal generation and processing method that utilizes only the targeted conductor (pipe or cable) as the transmission medium.

SUMMARY

In accordance with some embodiments, a transmitter and receiver for performing signal select in underground line location is provided. A transmitter for providing a signal on a line to be located includes at least one direct digital synthesizer, the direct digital synthesizer producing two component frequencies in response to an input square wave signal; and a feedback loop providing the input square wave.

A method of receiving a frequency modulated signal from an underground line includes measuring phase of two frequency separated signals; calculating a gradient of the phase dispersal function; and determining an offset based on the gradient. Another method of receiving a signal from an underground line includes processing incoming signals from one or more antennas; demodulating the signal select waveform; establishing a phase reference for a transmitter phase; accessing a difference between the phase reference and a measured phase to provide a measure of signal select.

These and other embodiments will be described in further detail below with respect to the following figures.

The drawings may be better understood by reading the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Further, embodiments of the invention are illustrated with reference to electrical schematics. One skilled in the art will recognize that these electrical schematics represent implementation by physical electrical circuits, implementation by processors executing algorithms stored in memory, or implementation by a combination of electrical circuits and processors executing algorithms.

Figure 1:
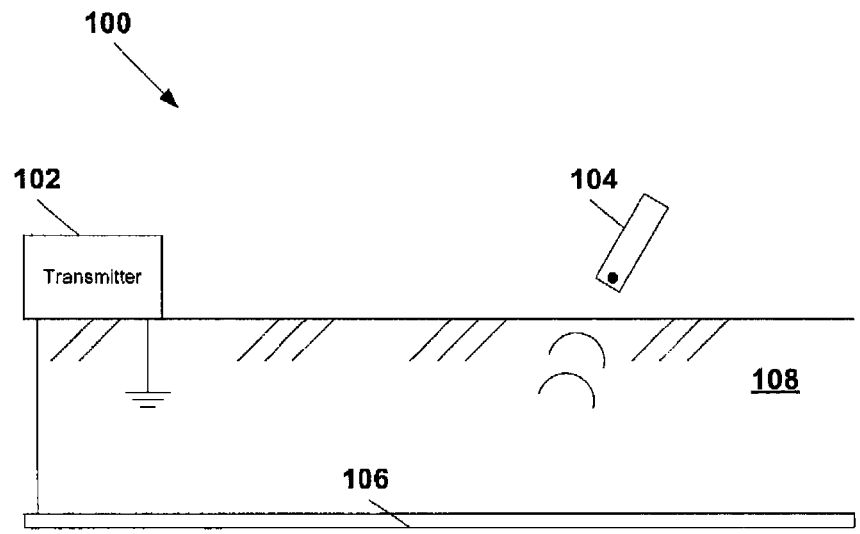
FIG. 1 illustrates operation of a line locator system according to some embodiments of the present invention.

FIG. 1 illustrates a line location system 100 according to some embodiments of the present invention. As shown in FIG. 1, line location system 100 includes a transmitter 102 and a receiver 104. Transmitter 102 is electrically coupled to a conductor 106 that is buried in the ground 108. Conductor 106 may, for example, be a conducting pipe or a wire and is generally considered to be a long conducting structure. Transmitter 102 provides an electrical signal along conductor 106, which then transmits an electromagnetic signal along its length. The electromagnetic signal is received by one or more antennae on receiver 104. Receiver 104 is passed over the surface of the ground 108 in order to locate the position of conductor 106 beneath the ground. From the signal strength, the depth and position of conductor 106 can be determined.

Line location system 100, according to some embodiments of the present invention, includes a Signal Select system. Signal Select is a system implementation that exists to provide additional functionality to a line location system 100. Line location systems 100 can then employ the Signal Select system and use low frequency, alternating magnetic fields to perform a variety of remote sensing applications.

In some embodiments, the Signal Select system can use a frequency shift key (FSK) as a modulating function in transmitter 102, which allows additional information to be decoded by receiver 104. In particular, receiver 104 can decode the original phase of the transmitted signal regardless of any phase changes that are caused by the reactance (complex impedance) of the buried conductor 108.

The original Signal Select (disclosed in U.S. Pat. No. 6,411,073, and developed further in U.S. Pat. No. 7,057,383, both of which are herein incorporated by reference in their entirety) used frequency modulation, for example frequency shift key modulation, and provided a mechanism for the receiver to decode the original transmitter phase. Subsequent developments, by allowing for a real-time measurement of the 'signal distortion' or 'current bleed-off' due to the reactance of conductor 108, have been developed.

Some embodiments of line location system 100 according to the present have further improved on the Signal Select technology. In particular, some embodiments remove the production calibration process for transmitter 102 and receiver 140, saving cost and time by utilizing a simpler process for manufacturing the system. Further, in some embodiments the architecture of transmitter 102 can be considerably less complex than in previous systems, saving costs and improving reliability. Further, in some embodiments receiver 104 need not rely on phase-locked loops (whether implemented by processors executing software or by electrical circuitry), providing for a faster response (lock-in time) for implementation of demodulation functions. In some embodiments, the overall signal-to-noise performance of line location system 100 can be improved.

Figure 2:
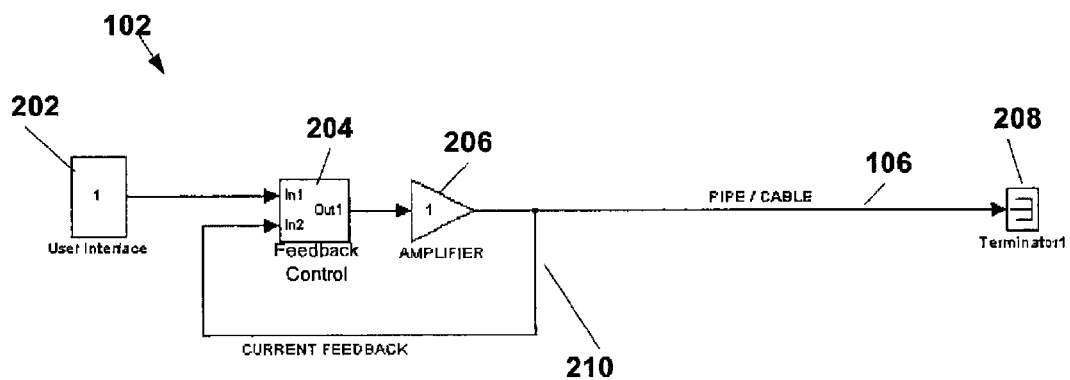
FIG. 2 illustrates at a high level a transmitter implementing some aspects of signal select according to some embodiments of the present invention.

FIG. 2 illustrates generally the system architecture of transmitter 102. As shown in FIG. 2, a user interface 202 is coupled to a feedback control 204. The output of feedback control 204 is coupled through an amplifier 206 to a line 106 (pipe or cable). The line is terminated with a terminator 208. A current feedback 210 couples an input of the feedback control 204 to the output signal from amplifier 206.

In some embodiments, the Signal Select system utilizes a composite waveform, for example having 8 cycles at a lower frequency (f0*50/51) and 8 cycles at a higher frequency (f0*50/49). This bifurcating waveform, which is produced by transmitter 102, gives rise to a modulating function that operates on the carrier frequency (f0) with a frequency f0/16.

Some embodiments of transmitter 102 can utilize electronic hardware and a microprocessor to implement the Signal Select waveform as described above and be able to drive or induce a current into an attached pipe or cable, conductor 106. Conductor 106 can present almost any load impedance and therefore transmitter 102 accommodates phase shifts caused by the complex impedance (reactance) of conductor 106.

The embodiment of transmitter 102 illustrated in FIG. 2 illustrates some features according to aspects of the present invention. Output amplifier 206 illustrated in FIG. 2 can, for example, be a D-class amplifier that is used in most standard cable locating systems. The example transmitter 102 illustrated in FIG. 2 generally behaves as a constant current generator such that the operator can request a fixed current at a defined carrier frequency through user interface 202.

Figure 3:
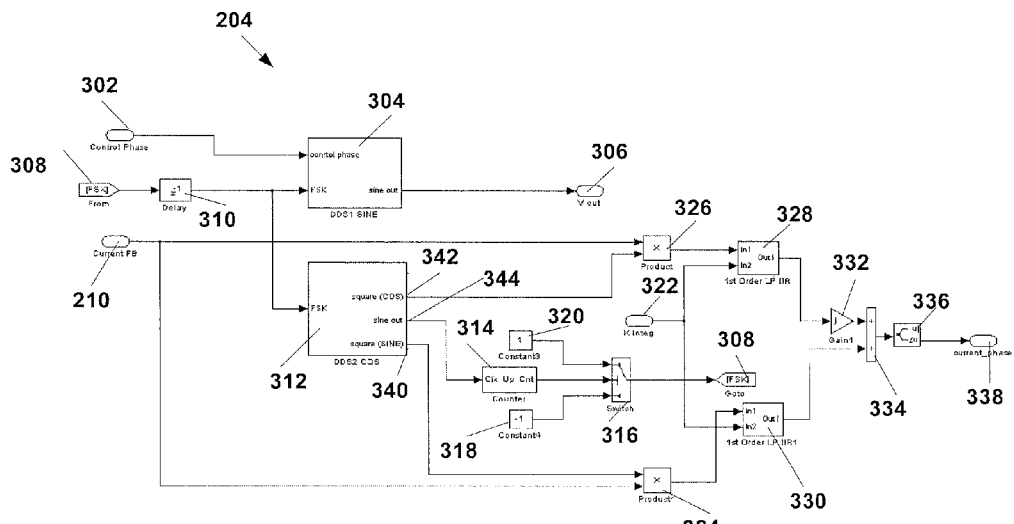
FIG. 3 illustrates a feedback control system for the transmitter illustrated in FIG. 1.

In some embodiments of the invention, transmitter 102 utilizes Direct Digital Synthesizers (DDS) devices, which are used to form a closed loop feedback system that may be under the control of a microprocessor. FIG. 3 shows the functional components of some embodiments of feedback control 204. So as to avoid undue complication, the diagram illustrated in FIG. 3 avoids electronic detail, the subject of which is within the abilities of one skilled in the art. For example, some embodiments may include three or more DDS devices and two or more microprocessors. As illustrated in FIG. 3, the DDSs 304 and 312 can be utilized for driving the Signal Select waveform and correcting the phase of the Signal Select modulating function.

As shown in FIG. 3, DDS 304 can be a standard Direct Digital Synthesizer such as an Analog Devices AD9833 DDS, for example. DDS 304 provides the Signal Select output signal 306 (denoted Vout in the drawing) that is coupled to amplifier 206 illustrated in FIG. 2. The FSK signal at input 308 is essentially a square wave at a frequency f0/16 and causes DDS 304 to bifurcate between the two component frequencies (f0*50/51) and (f0*50/49)—the waveform having 8 cycles at each frequency. The FSK signal is delayed by a delay 310 before being input to DDS 304. Accordingly, in response to the FSK signal, DDS 304 switches between the two values held in the frequency accumulator registers inside DDS 304. The other input to DDS 304 is the control phase signal at input 302, which is the feedback component. The control phase signal serves to phase advance or retard the Vout signal generated by DDS 304 and makes use of a phase accumulate register inside DDS 304.

DDS 312 is a similar device as DDS 304 and uses the FSK control signal in an identical operation to that of DDS 304. DDS 312 does not, however, use the phase accumulate register as the purpose of DDS 312 is to provide a fixed phase reference. Output 344, marked 'sine-out', is used for the purpose of counting the 8 cycles at the 2 component frequencies and so for generating the FSK signal at input 308. As shown in FIG. 3, the signal from output 344 is input to a counter 314 that controls a switch 316. Switch 316 switches between input 320 and input 318 and outputs the FSK signal at input 308.

Outputs 342 'square (COS)' and 340 'square (SIN)' are in-phase and quadrature-phase square waves that allow feedback 204 to calculate the phase of the main current feedback signal that is connected to conductor 106. As shown in FIG. 3, the signal from output 340 is mixed with the current feedback signal from input 210 in multiplier 324. The output signal from multiplier 324 is input to filter 330. Similarly, the signal from output 342 is mixed with the current feedback signal from input 210 in multiplier 326. The output from multiplier 326 is input to filter 328. Filters 328 and 330 may, for example, be integrating filters and may be first-order low-pass (LP) IIR filters. Such filters can be implemented in hardware with op-amps or as a digital filter in the domain of a microprocessor. The input signal at input 332, denoted 'K Integ', is essentially the time constant of the integrator (1/RC for an analogue system). The output signals from filter 328 is combined in inverter 332 and summer 334 and the phase and amplitude is calculated in block 336 to obtain an output signal at output 338. The output signal, marked 'current phase', can be utilized for the purpose of correcting the problem of phase dispersal in some embodiments, as is discussed further below.

In some embodiments, feedback 204 can utilize topology around DDS 312 that only uses a cosine feedback term from output 342. In this implementation the control phase at input 302 is adjusted until the cosine feedback signal is zero.

Figure 4:
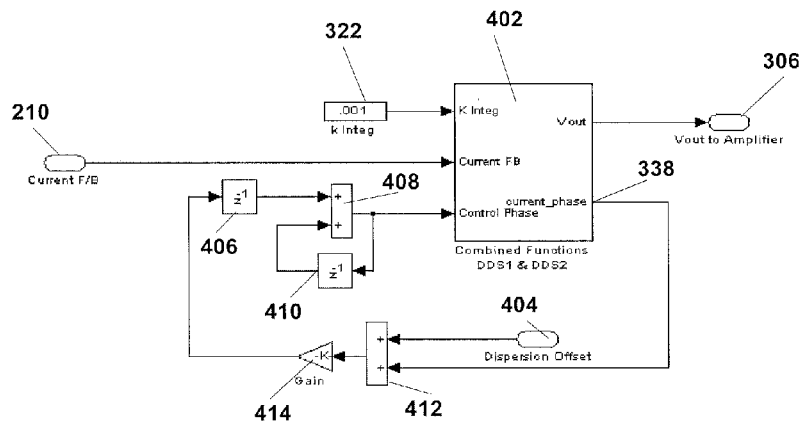
FIG. 4 illustrates a current feedback and phase control loop for the transmitter illustrated in FIG. 1.

FIG. 4 shows a typical use of the current feedback 210 to control the overall phase in DDS 304. In FIG. 4, the functions of DDS 304 and 312 are combined into feedback block 402. As shown in FIG. 4, an integrator formed by adder 408 and delays 406 and 410 drives the 'Control Phase' input. The input signal to this integrated is derives from the current phase signal from output 338, which is summed with a dispersion offset signal from input 404 in summer 312 and amplified by amplifier 414. This integrate signal from adder 408 phase advances or retards the entire waveform. Other feedback processes can be utilized in some embodiments of the invention.

Referring to the waveform definition of Signal Select as described above, the modulating function (a square wave with frequency f0/16) carries the original phase information of the transmitted waveform irrespective of any phase shifts which may arise as the signal travels along conductor 106.

Figure 5:
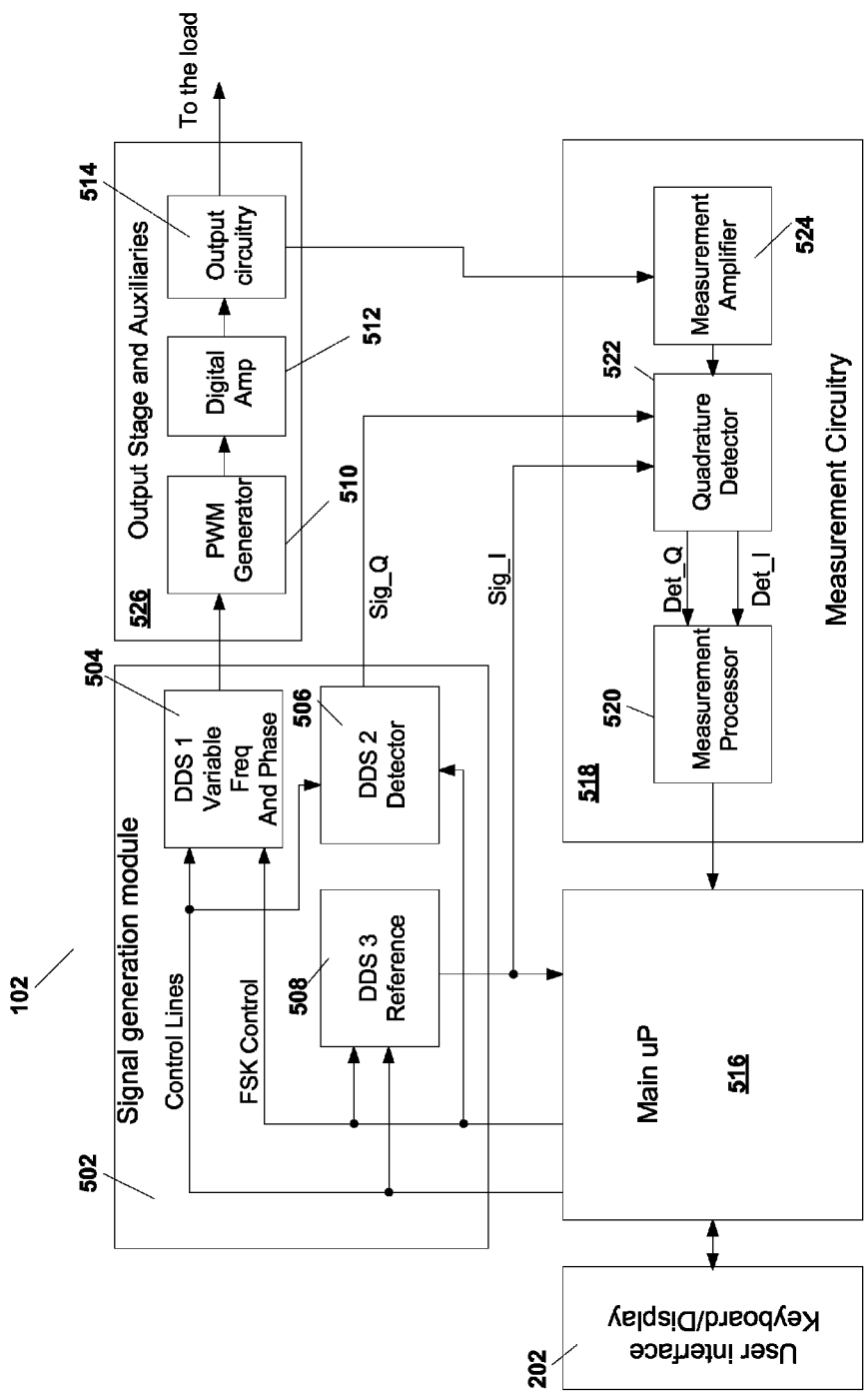
FIG. 5 illustrates a transmitter with a signal select mode according to some embodiments of the present invention.

FIG. 5 illustrates another example of transmitter 102 with a Signal Select mode according to some embodiments of the present invention. The example of transmitter 102 shown in FIG. 5 can include multiple functional modes, as requested by the cable and pipe locating industry. As illustrated in FIG. 5, transmitter 102 can include a signal generation module 502, an output stage 526, and measurement circuitry 518. A microprocessor 516 can be coupled to receive signals from measurement circuitry 518 and provide signals to signal generation module 502. Microprocessor 516 can be coupled to user interface 202 and can provide multiple modes of operation according to the input received from user interface 202. Output stage 526 can receive an output signal (vout at output 306) and drives a load, for example conductor 106, according to the output signal. Signal generation module 502 and output stage 526 provide signals for measurement circuitry 518.

As illustrated in FIG. 5, signal generation module 502 can include DDS 504 and DDS 506. As is the case with DDS 304, DDS 504 provides the output signal that is coupled to conductor 106. DDS 506, similarly to DDS 312, provides a signal to measurement circuitry 518. Microprocessor 516 provides control lines and an FSK control signal to DDS 504 and 506. A third DDS, DDS 508, is coupled to receive the control lines and FSK control from microprocessor 516 and provide a reference signal to microprocessor 506 and measurement circuitry 518. As shown in FIG. 5, the output signal from DDS 506 can be a quadrature signal SIG_Q while the output signal from DDS 508 can be the in-phase signal SIG_I.

Output stage 526 can include a pulsed-wave modulation (PWM) generator 510 coupled to receive the output signal from signal generation module 502. The output signal from PWM generator 510 is input to an amplifier 512, which may be a digital amplifier. The output signal from amplifier 512 is input to output circuitry 514, which couples the signal to a load such as conductor 106 and provides a feedback signal to measurement circuitry 518.

Measurement circuitry 518 includes an amplifier 524 that receives the feedback signal from output stage 526. The output signal from amplifier 524 is input to a quadrature detector 522, which also receives the output signals SIG_Q and SIG_I from signal generation module 502. Quadrature detector 522 provides a detected quadrature signal DET_Q and detected in-phase DET_I signal to a measurement processor 520. The output signal from measurement processor 520 is provided to microprocessor 516.

When the Signal Select mode is chosen by the user from user interface 202, microprocessor 516 will set DDS 504 in signal generation module 502 to generate the proper frequency. At start-up the phase of this signal is set at a reference value.

In the same time DDS 506 and DDS 508 are set to generate the appropriate quadrature signals marked in FIG. 5 as "Sig_I" and "Sig_Q". The Signal Select generated by DDS 504 in signal generation module 502 is applied to output stage 526 and from there into the load, which may be conductor 106. Based on the load reactance, a phase offset between the voltage and the current generated will be created. The measurement circuitry 518 will sample the current in the load and apply it to a quadrature detector 522, where also the above "Sig_I" and "Sig_Q" are injected. The "Det_I" and "Det_Q" signals at the output of quadrature detector 522 are applied to a measurement processor 520 that will calculate the magnitude and phase of the sampled signal. These results are sent to microprocessor 516 and based on that microprocessor 516 will control the level of the output signal and will adjust the phase of DDS 504 accordingly, as requested by the Signal Select principle.

In the same time, because the Signal Select output signal is a FSK type of waveform, the signal generated by DDS 508 in signal generation module 502, respectively "Sig_I", is used to trigger the switching of the two components F1 and F2 of the FSK signal. This control signal is generated by microprocessor 516 and applied to the signal generation module 502 as the "FSK control" signal.

To improve the phase accuracy measurement specific for a high performance Signal Select functionality, a dedicated software algorithm can be executed by microprocessor 516, as specified above. Once the phase correction algorithm is executed the unit is ready for operation. In some embodiments, the signal generation module 502 is implemented using a combination of three DDS circuits as illustrated in FIG. 5, but other circuitries that have frequency and phase controls can be used as well.

It is desirable to be able to control the zero-crossing of the current waveform as it changes between the two component frequencies. When transmitter 102 is coupled to a complex impedance (typically having inductance and capacitance), the modulating function utilizes a phase offset introduced to the demodulating device (in this case receiver 104) in order to determine the true original phase.

The two component frequencies discussed above will be shifted by any reactance coupled to the output of transmitter 102 and importantly, the two component frequencies will be shifted by different amounts relative to the carrier frequency 'f0'. At the point of the transition, there is a discontinuity in the phase modulation, which can be corrected with a compensation dispersion offset as illustrated in FIG. 4. Some embodiments of the invention can use a principal of gradient measurement of the phase dispersal function ($\partial\phi/\partial f$) to provide for the compensation dispersion offset in an adaptive manner. Accordingly transmitter 102 takes measurements of the phase modulation $\phi$ firstly at a frequency 'f0−Δ/2' and subsequently at a higher frequency 'f0+Δ/2'. The frequency spacing Δ is set at a level that results in high measurement accuracy as a function of phase contrast. A typical value for Δ can, for example, be 30 Hz, although other values can be used. Once the phase dispersal function gradient ($\partial\phi/\partial f$) is known, this value is added to the phase modulating function in accordance with the following equations:

$$\frac{\partial \phi}{\partial f} = \frac{\phi\left(f_0 + \frac{\Delta}{2}\right) - \phi\left(f_0 - \frac{\Delta}{2}\right)}{\Delta}$$

$$\phi' = \phi + \alpha \frac{\partial \phi}{\partial F},$$

where $\Phi'$ is the compensation dispersion offset and α is a parameter that represents the 'run-time' interpolation of the phase-dispersal gradient. In some embodiments, the parameter a can be chosen to be 25 Hz for this process.

Receiver 104 performs a number of important functions. In particular, Receiver 104 may perform several functions related to the Signal Select system described above with respect to transmitter 102. One such function is that receiver 104 processes the incoming signals from a set of antennas, which may be ferrite antennas, and calculates an accurate signal magnitude. A narrow bandwidth filter (for example about 7 Hz) can be used in determining the signal magnitude. The incoming signals detected by the antenna are phase coherent but not phase locked to receiver 102. The signal magnitude should be unaffected by the bifurcating frequency, which defines Signal Select signals according to embodiments of the present invention. Receiver 104 also demodulates the Signal Select waveform and establishes a phase reference for the true transmitter phase—that is the phase before any subsequent line reactance causes a phase shift. Further, receiver 104 also assesses the difference between the phase reference and the measured phase and in so doing can provide a measure for the 'signal distortion'.

Figure 6:
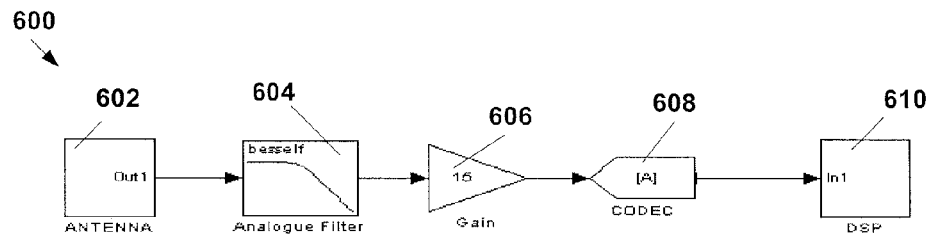
FIG. 6 illustrates a receiver according to some embodiments of the present invention.

FIG. 6 shows the principal elements of a receiver signal path 600 for any given antenna channel of receiver 104. In some embodiments, receiver 104 can have multiple antennas and therefore multiple receiver signal paths 600. As shown in FIG. 6, signal path 600 includes an antenna 602 that receives an electromagnetic signal. The electromagnetic signal is filtered in filter 604 and amplified in amplifier 606 prior to being processed by a coder-decoder (CODEC) 608. CODEC 608 can be a Delta-Sigma device, which includes an intrinsic anti-alias filter. In the example shown in FIG. 6, CODEC 608 can sample, for example, 24-bit data at typically about 48 kHz. Therefore, the Signal Select signal can be processed entirely within the baseband of CODEC 608. The output signal from CODEC 608 is then input to a digital signal processor (DSP) 610.

Figure 7:
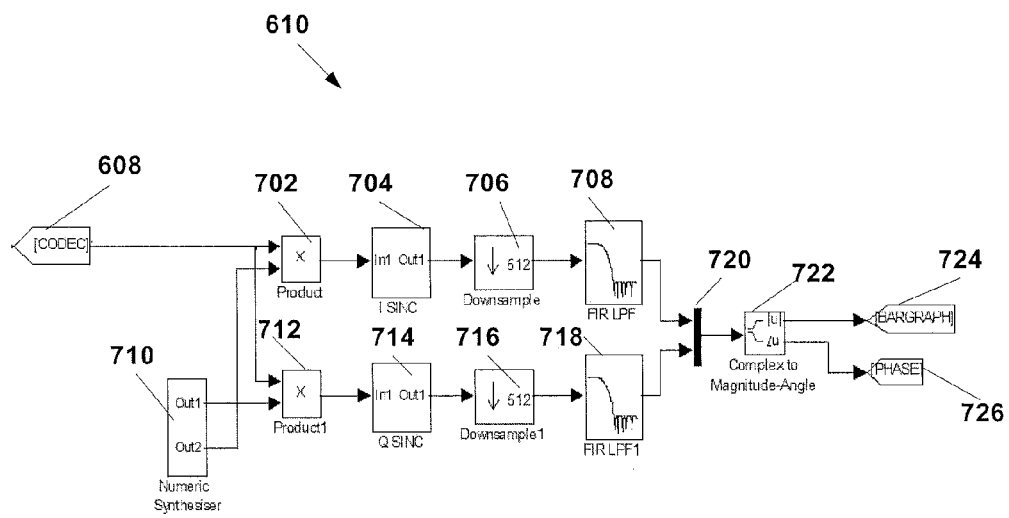
FIG. 7 illustrates narrow bandwidth signal processing according to some embodiments of the present invention.

FIG. 7 shows an example of DSP 610. DSP 610 can employ narrow band signal processing, which serves to compress the bandwidth from the CODEC data rate (48 kHz) to typically 94 Hz at the output of DSP 610. Correspondingly, the signal bandwidth is compressed from 24 kHz (output from CODEC 608) to typically 7 Hz at the output from DSP 610. This bandwidth compression gives rise to an enhanced dynamic range and a good receiver would be expected to achieve 138 dBrms/√Hz from a 24-bit CODEC 608 (assuming that CODEC 608 has a SINAD (signal to noise plus distortion) ratio of >96 dB).

As shown in FIG. 7, DSP 610 receives the signal from CODEC 608 into two signal processing paths, the paths processing in-phase and quadrature phase components, because there is no requirement for receiver 104 to lock to the phase of transmitter 102. This duplicated processing, as applied to Signal Select, differs from previous implementations of Signal Select because the previous implementations used a Phase Locked Loop to vector all the information into a single-phase carrier.

As shown in FIG. 7, in the in-phase path the signal from CODEC 608 is input to multiplier 702, which mixes the output signal with an output signal from a numeric synthesizer 710. The output signal from multiplier 702 is input to a synchronizer 704. The signal is then downsampled in a converter 706, which can downsample for example by a factor of 512 as shown in FIG. 7, and filtered in a filter 708. Filter 708 may be a low-pass filter. Similarly, in the quadrature path the output signal from CODEC 608 is mixed with another output signal from numeric synthesizer 710 in multiplier 712. The output signal from multiplier 702 is synchronized in synchronizer 714, down sampled in converter 716, and filtered in filter 718, which can be a low pass filter. The in-phase path and the quadrature path can include the same components, the difference between the two paths being the signal from numeric synthesizer 710 that the output signal from CODEC 608 is mixed with.

Numeric synthesizer 710 can be similar to that described, for example, in U.S. Pat. No. 4,285,044 to Thomas et al (expired). Numeric synthesizer 710 provides sine and cosine outputs at the carrier frequency 'f$_0$' and serves to shift the Signal Select waveform close to a DC signal. The exact programming carrier frequencies can be offset to account for the 'average' frequency which will be integrated in the FIR filters 708 and 718 as follows:

$$f_0^* = f_0\left(\frac{\gamma^2 - 1}{\gamma^2}\right),$$

where γ is a parameter which can be, for example, 50.

As shown in FIG. 7, the output signals from filters 708 and 718 are combined in combiner 720. Calculation 722 provides two outputs 724 and 726. The bargraph signal from output 724, which represents the signal magnitude, is given by $$MAG = \sqrt{I^2 + Q^2},$$

where I is the in-phase signal magnitude and Q is the quadrature signal magnitude. Similarly, the phase is given by $$Phase = Tan^{-1}\left(\frac{I}{Q}\right).$$

The phase serves as the phase reference of the carrier frequency 'f$_0$'. The phase demodulation process follows a similar algorithm. In this case the in-phase 'I' and quadrature phase 'Q' information is extracted at a fraction, typically ⅛, the bandwidth of CODEC 608 (equivalent downsampling factor of 8 comparing to 512 as shown in FIG. 7). The modulation information is extracted using a digital FM demodulator such as that shown in FIG. 8.

In an ideal situation, without any unwanted interference, the output signal from the demodulator (the input signals to combiner 720 in FIG. 7) would be a 16 Hz square wave (actually a slightly asymmetric square wave having 8 cycles at the lower frequency and 8 cycles at the higher frequency). Therefore, combiner 720 can recover the true transmitter phase—the frequency shift key FSK.

Figure 8:
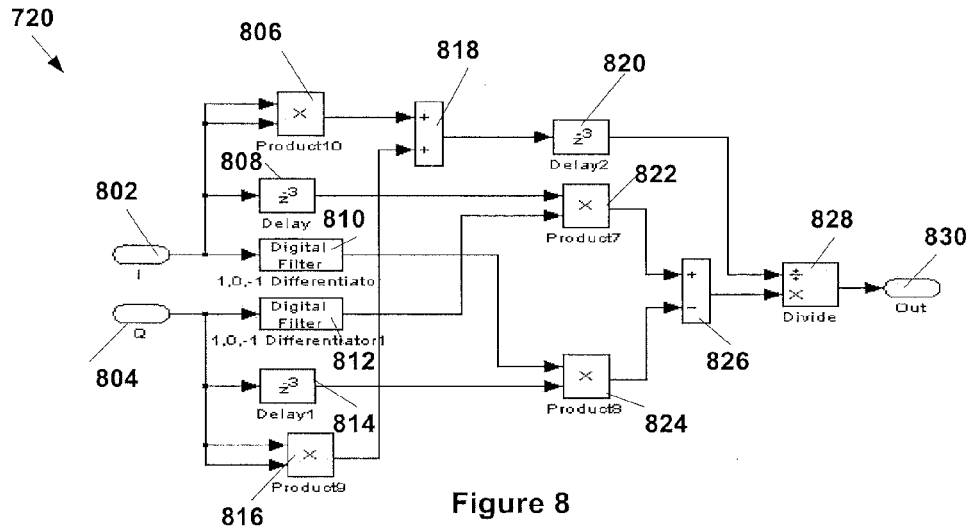
FIG. 8 illustrates an FM demodulator that can extract the signal select phase according to some embodiments of the present invention.

The next process is the recovery of the true transmitter phase—the frequency shift key FSK. As shown in FIG. 8, inputs 802 and 804 receive the output signals from filters 708 and 718, respectively, which correspond to the signals I and Q. As shown in FIG. 8, input signal I from input 802 is provided to digital filter 810, delay 808, and is provided to multiplier 806 to calculate I$^2$. Similarly, input signal Q from input 804 is provided to digital filter 812, delay 814, and multiplier 816 to calculate Q$^2$. The output signal from multiplier 816 and multiplier 806 are added in adder 818 to obtain I$^2$+Q$^2$, which is provided to delay 820. The output signal I from delay 808 is mixed with the filtered signal Q, Q', output from digital filter 812 in multiplier 822. The output signal Q from delay 814 is mixed with the filtered signal I, I', from digital filter 810 in multiplier 824. The output signals from multipliers 822 and 824 are input to summer 826 to provide I'Q−Q'I. The output signals from delay 820 and summer 826 are provided to divider 828 to obtain the output value (I'Q−Q'I)/(I$^2$+Q$^2$), which provides an error indication. Delays 810, 814, and 820 temporarily align the signals with the output signals from filters 810 and 812.

As such, FIG. 8 illustrates a frequency demodulator. FIG. 8 takes the signal from a compressed bandwidth, for example the CODEC bandwidth/10, and gives an output that follows the modulating function, for example a square wave which is oscillating at f0/16.

Figure 9:
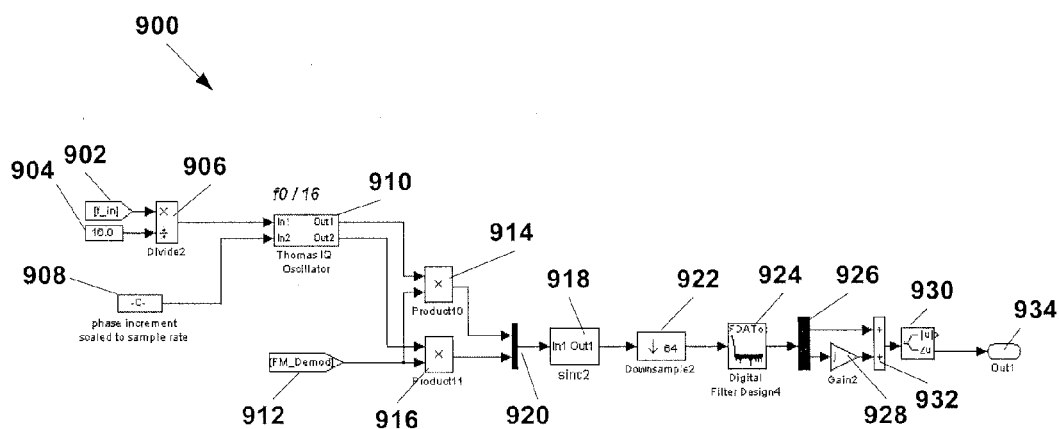
FIG. 9 illustrates recovery of the FSK phase reference according to some embodiments of the present invention.

FIG. 9 illustrates further processing 900. As shown in FIG. 9, the input signal at input 902 is divided by the input 16 in input 904, along with a phase increment from input 908, are input to a Thomas oscillator 910, which provides sine and cosine wave functions. The output signals from the FM demodulator, the signals from filters 708 and 718, are multiplied by the sine and cosine outputs from 'Thomas' Oscillator 910, which is programmed at 'f0/16'. As shown in FIG. 9, the output signals from oscillator 910 are mixed with the frequency demodulated signal generated by FIG. 8, the output signal from output 830, that is received on input 912. As shown in FIG. 9, the signal input on input 912 is mixed with signals from filters 708 and 718 in multipliers 914 and 916 and the results combined in combiner 920. Each of the signals is then processed through synchronizer 920, downsampler 922, and digital filter 924 and gain adjusted in amplifier 928 before being summed in summer 932. Calculation block 930 then provides the magnitude and phase of the signal. Output 934 then provides the phase signal, which can be used as a reference phase.

Referring to FIG. 9 it is worthwhile to note the down-sampling ratio is 64 so that the overall down-sampling equates to the narrow band signal processing algorithm. Therefore in this example: 512 (narrow band signal algorithm)=8 (downsampling before FM demodulator)*64.

The final processing stage is the comparison of the signal phase, the output signal from output 726, and the demodulated phase reference, the output signal from output 830. In addition various numerical errors are eliminated. These errors are caused by mathematical truncation in the programming of the Thomas oscillator, if left unprocessed they would cause a slow drift in the reference phase and render the Signal Select useless. The phase data is cast to an integer (16-bit) which is a convenient mechanism to describe the natural modulus function as it wraps at 2$^\pi$ radians:

$$\phi_{Signal\ Select} = \phi_{NB\ Phase} - 16 \times \phi_{Demod\ Phase} - \phi_{Oscillator\ Correction}$$

$$\phi_{Oscillator\ Correction} = \phi_{f0\ Oscillator} - 16 \times \phi_{\frac{f0}{16} Oscillator}$$

In the above equation, $\phi_{NB\ Phase}$ corresponds to phase output signal 726 shown in FIG. 7 and represents the average phase of the two frequency components of the signal select signal.

The parameter $\phi_{Demod\ Phase}$ corresponds to the output signal on output 934 of FIG. 9.

The correction factor $\phi_{Oscillator\ Correction}$ is a small correction that exists because mathematical truncation using 32 bit calculation means that the numeric "Thomas" oscillators running at f0 and f0/16 will not keep a fixed phase relationship over time. The drift may be small, but is enough to make the Signal Select signal useless after a short time (for example a minute or two). This phase drift is measured "on the fly" by receiver 104 and the results used. The difference shown above, then, represents the difference in phase of the frequency outputs of numeric synthesizer 710 (which produces a signal with frequency f0) and oscillator 910 (which produces a signal with frequency f0/16).

The output is '$\phi_{Signal\ Select}$', which is further utilized in Signal Select processing. As the signal phase varies along conductor 106, this function will track the phase change with respect to the reference component '$\phi_{Demod\ Phase}$'. The typical use of Signal Select is to provide a real-time measure of 'signal distortion'.

One further task is the task of phase tracking. The Transmitter and the Receiver operate as entirely separate systems and do not share a common phase reference or system clock. To solve this problem, Receiver 104 automatically tracks to the Transmitter output signal. This is a subtle feature implemented in embodiments of the present invention, as Receiver 104 has to track to an entirely 'imaginary' frequency—Signal Select being defined as 8 cycles at (f0*50/51) and cycles at (f0*50/49) and the tracking therefore finds the true average frequency f0—even though it never happens in time. The subtle point of this, is that without tracking, f0 still contains the natural frequency errors between receiver 104 and transmitter 102 (typically clock errors caused by crystal oscillators and of the order of 30 ppm)—without correction this error will cause significant inaccuracy in the components of the above equations.

The process of phase tracking is implemented on the Narrow Band Signal Processing algorithm as shown in FIG. 7. Essentially the phase output is differentiated and the resulting signal is integrated. This value subsequently serves as a negative feedback frequency error and is used to adjust the frequency accumulator in the Thomas Oscillator (denoted numerical synthesizer in FIG. 7).

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A transmitter, comprising:
   at least one direct digital synthesizer, the direct digital synthesizer producing a composite output signal in response to an input square wave signal, the composite output signal having a first frequency component for a first period followed by a second frequency component for a second period; and
   a feedback loop providing a feedback signal coupled with the at least one direct digital synthesizer that adjusts the first and second frequency components of the composite output signal;
   wherein the at least one direct digital synthesizer includes a first digital synthesizer that produces an output signal from the input square wave signal and a control phase signal and a second digital synthesizer that provides a sine wave output for generation of the input square wave signal and signals for generating a current phase signal from the feedback signal.

2. The transmitter of claim 1, wherein the current phase signal is mixed with a dispersion offset signal and integrated to form the control phase signal.

3. The transmitter of claim 1, further including an amplifier that couples the output signal to a load conductor.

4. The transmitter of claim 1, wherein an operator can request a fixed current at a defined carrier frequency through a user interface coupled to the feedback loop.

5. The transmitter of claim 1, wherein the first frequency component is f0*50/51 and the second frequency component is f0*50/49, wherein f0 is a carrier frequency.

6. The transmitter of claim 5, wherein the composite output signal has 8 cycles at each of the first frequency component and the second frequency component.

7. A transmitter, comprising:
   a signal generation module that generates a composite output signal, the composite output signal having a first frequency component for a first period followed by a second frequency component for a second period, the signal generation module including:
     a first direct digital synthesizer that provides the composite output signal, the composite output signal being based on a control phase signal and an FSK control signal;
     a second direct digital synthesizer that provides a quadrature signal, the quadrature signal being based on the control phase signal and the FSK control signal; and
     a third direct digital synthesizer that provides an in-phase signal, the in-phase signal being based on the control phase signal and the FSK control signal;
   an output stage, the output stage coupling the composite output signal to a load conductor;
   a measurement circuitry that receives a signal from the output stage and phase signals from the signal generation module and providing a feedback signal; and
   a microprocessor coupled to the signal generation module and the measurement circuitry, the microprocessor controlling the signal generation module in response to the feedback signal.

8. The transmitter of claim 7, wherein the output stage includes:
   a pulse-wave modulation generator that receives the composite output signal from the signal generation module;
   a digital filter that receives a modulated output signal from the pulse-wave modulation generator; and
   an output circuit that couples a filtered output signal from the digital filter to the load conductor, the output circuit providing a signal to the measurement circuitry.

9. The transmitter of claim 8, wherein the measurement circuitry includes:
   a measurement amplifier coupled to receive the signal from the output circuit;
   a quadrature detector coupled to receive an amplifier signal from the measurement amplifier; and
   a measurement signal that provides the feedback signal to the microprocessor based on a quadrature detector signal from the quadrature detector.

10. A method, comprising:
    providing, by a first direct digital synthesizer, a composite output signal based on a control phase signal and an input square wave, the composite output signal including a first frequency component for a first period followed by a second frequency component for a second period;

providing, by a second direct digital synthesizer, a sine wave output for generation of the input square wave and for generation of a current phase signal from a feedback signal; and providing, by a feedback loop coupled to the first direct digital synthesizer and the second direct digital synthesizer, a feedback signal that adjusts the first frequency component and second frequency component of the composite output signal.

11. The method of claim 10, further comprising mixing the current phase signal with a dispersion offset signal and integrating to form the control phase signal.

12. The method of claim 10, further comprising amplifying the composite output signal and providing it to a load conductor.

13. The method of claim 10, wherein providing the feedback signal by the feedback loop comprises:

providing, by the first direct digital synthesizer, the composite output signal to an output stage, the output stage providing a first intermediary feedback signal to a measurement circuitry;

providing, by the measurement circuitry, a second intermediary feedback signal to a microprocessor; and generating, by the microprocessor, the feedback signal in response to the second intermediary feedback signal.

14. The method of claim 10, further comprising:

providing the composite output signal to a pulse-wave modulation generator;

modulating the composite output signal, by the pulse-wave modulation generator, and providing a modulated output signal to a digital filter; and filtering, by the digital filter, the modulated output signal, and providing a filtered output signal.

* * * * *